United States Patent
Subrahmanyan et al.

(10) Patent No.: US 7,590,154 B2
(45) Date of Patent: Sep. 15, 2009

(54) SAMPLED ACCUMULATION SYSTEM AND METHOD FOR JITTER ATTENUATION

(75) Inventors: Ravi Subrahmanyan, Windham, NH (US); Venkat Sreenivas, Winchester, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 511 days.

(21) Appl. No.: 11/525,656

(22) Filed: Sep. 22, 2006

(65) Prior Publication Data
US 2008/0075125 A1    Mar. 27, 2008

(51) Int. Cl.
*H04J 3/22* (2006.01)
(52) U.S. Cl. .............. 370/545; 370/389; 370/473; 370/395.51; 370/535
(58) Field of Classification Search ............ 370/391, 370/395.62, 471, 476, 516, 373, 506, 372
See application file for complete search history.

(56) References Cited

U.S. PATENT DOCUMENTS

| | | | | |
|---|---|---|---|---|
| 5,572,515 A | * | 11/1996 | Williamson et al. | 370/252 |
| 5,850,387 A | * | 12/1998 | Lyon et al. | 370/250 |
| 6,188,701 B1 | * | 2/2001 | Tsukamoto et al. | 370/535 |
| 6,240,087 B1 | * | 5/2001 | Cummings et al. | 370/360 |
| 6,982,995 B2 | * | 1/2006 | Acimovic | 370/518 |
| 7,227,876 B1 | * | 6/2007 | Cochran et al. | 370/509 |
| 7,298,808 B1 | * | 11/2007 | Rey | 375/372 |
| 7,564,875 B2 | * | 7/2009 | Linkewitsch et al. | 370/506 |
| 2001/0016023 A1 | * | 8/2001 | Roy et al. | 375/372 |
| 2002/0122441 A1 | * | 9/2002 | Kawasumi et al. | 370/535 |
| 2003/0099204 A1 | | 5/2003 | Subrahmanyan et al. | 370/252 |
| 2003/0227988 A1 | | 12/2003 | Subrahmanyan et al. | 375/373 |

FOREIGN PATENT DOCUMENTS

EP      1067722 A2  *  1/2001

\* cited by examiner

*Primary Examiner*—Ricky Ngo
*Assistant Examiner*—Dewanda Samuel
(74) *Attorney, Agent, or Firm*—Law Office of Gerald Maliszewski; Gerald Maliszewski

(57) ABSTRACT

A system and method are provided for a sampled accumulation method that maps information into Synchronous Payload Envelopes (SPEs). The method buffers data from a plurality of tributaries, and sequentially stores buffer-fill information for each tributary in a first memory, at a rate of up to one tributary per system clock (Fsys) cycle. A stored accumulation of buffer-fill information for each tributary is updated at a sample rate frequency (Fsample), where Fsample $\leq$ Fsys. The stored accumulation of buffer-fill information is used to calculate stuff bit opportunities for each tributary. As a result, the rate of data being mapped into outgoing tributaries is regulated, and the outgoing mapped tributaries are combined in a SPE.

21 Claims, 7 Drawing Sheets

SAMPLED ACCUMULATION SYSTEM AND METHOD FOR JITTER ATTENUATION

BACKGROUND OF THE INVENTION

1. Field of the Invention

This invention generally relates to digital envelope-framed communications and, more particularly, to a system and method for filtering buffer-fill information that is used in the calculation of stuff bit opportunities for loading data tributaries into a Synchronous Payload Envelope (SPE).

2. Description of the Related Art

In a synchronous communications network, digital payload data is carried at a particular clock frequency within a synchronous message format. This payload data may include both asynchronous digital data and synchronous digital data originating at a different data rate in a foreign digital network. The Synchronous Optical Network (SONET), and its European counterpart the Synchronous Digital Hierarchy (SDH), provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes overhead data that provides for coordination between various network elements, and permits data delineation.

One of the benefits of SONET is that it can carry large (high-speed) payloads (above 50 Mb/s). However, the existing slower speed digital hierarchy can be accommodated as well, thus protecting investments in current equipment. To achieve this capacity, the STS Synchronous Payload Envelope (SPE) can be sub-divided into smaller components or structures, known as Virtual Tributaries (VT) for the purpose of transporting and switching payloads smaller than the STS-1 rate. All services below the DS3 and E-3 rates are transported in the VT structure.

In SONET there are four sizes of virtual tributaries, a VT-6 (12 columns of data), VT-3 (6 columns of data), VT-2 (4 columns of data), and VT-1.5 (3 columns of data). A virtual tributary group (VTG) is formed of a single type of VT and by definition each VTG contains 12 columns of data. Thus, there can be one (1) VT-6, two (2) VT-3, three (3) VT-2, or 4 VT-1.5 VTs per VTG. Because there are 12 data columns per VTG, there are seven VTGs within a single STS-1 SPE, with a column of data providing the path overhead data and two (2) columns of stuff data. The VGs are grouped within a Virtual Superframe that comprises four (4) consecutive STS-1 message frames. The VTGs within the superframe each have varying numbers of VTs within them, and together define a virtual SPE. The VTs contained within the virtual SPE may be operated in a fixed or floating mode. In a fixed mode, the VT SPE mapping into the four (4) STS-1 SPEs comprising the superframe is fixed. This reduces the interface complexity and is designed for maximum efficiency of the network elements. A floating VT mode allows the VT SPE to float within the virtual SPE defined for the VTs. A floating VT requires a VT payload pointer and VT path overhead. In the case of a VT floating within a virtual superframe, the VT payload pointer is defined by bytes, V1 and V2. In addition, payload resynchronization and payload adjustment is accomplished using the V1, V2, and V3 in the same manner as the H1, H2, and H3 bytes in the transport overhead of the STS-1 message as described below.

Similarly, in a SDH STM-1 format, which is based on a 2.048 Mbit/s hierarchy, there is a bandwidth flexible virtual container (VC) that permits the transmission of high-speed packet switched services, ATM, contribution video, and distribution video. In addition, the VC permits transport and networking at the 2 Mbit/s, 34 Mbit/s, and 140 Mbit/s in addition to the 1.5 Mbit/s hierarchy.

The lowest level of multiplexing in a SDH message includes a single container (C). The containers are used to create a uniform virtual container (VC) payload through bit-stuffing to bring all the inputs to the container to a common bit-rate that is suitable for multiplexing in the VCs. There are two levels of VCs. A low level VC, i.e., VC-11, VC-12, and VC-2, includes data at a rate from 1.5 Mbit/s to 6 Mbits/s. Upper level VCs, i.e., VC-3 and VC-4, include data at a rate of 34/45 Mbit/s and 140 Mbit/s. The various VCs are converted into Transmission Units (TUs) with the addition of tributary pointer information. Thus, a VC-11 becomes a TU-11, a VC-12 becomes a TU-12, a VC-2 becomes a TU-2, and a VC-3 becomes a TU-3.

A single TU-2 or 3 TU-12s, or 4 TU-11s are combined into a Transmission Unit Group 2(TUG-2). Seven TUG-2s can be used to form a VC-3 or a TUG-3. Three TUG-3s are combined to form a VC-4. A single VC-3 or a single VC-4 are converted into an administrative unit three (AU-3) or an AU-4 respectively, with the addition of an administrative unit pointer. Three AU-3s or a single AU-4 are formed into an Administrative Unit Group (AUG). One AU-4, four AU-4s, or 16 AU-4s are formed into an STM-1, STM-4, or an STM-16, respectively. The administrative unit group forms the SPE of the SDH STM-1.

In a floating TU mode, four consecutive 125 microsecond frames of the VC-4 are combined into a single 500 microsecond called a TU multi-frame. The tributary units comprising the TU multi-frame signal also contain payload pointers to allow for flexible and dynamic alignment of the VCs within the TU multi-frame. In this instance, the payload pointer value indicates the offset from the TU to the first byte of the lower order VC. This mechanism allows the AU and TU VC payloads to vary with respect to phase to one another and to the network, while allowing the VCs comprising the AUs and TUs to be synchronously multiplexed. The TU multi-frame overhead consists of four bytes: V1, V2, V3, and V4. Each of the four bytes is located in the first bytes of the respective TU frame in the TU multi-frame signal. The V1 and V2 bytes designate the position of the first byte of the VC, the V3 byte provides a payload pointer adjustment opportunity, and the V4 byte is reserved. Thus each of the VCs within an STM can float relative to one another If the digital data that is mapped and framed in the STS-N/STM-N is originally carried by a clock signal having a different frequency than the SONET/SDH line rate clock, certain adjustments to the framed digital data must be made. For example, if a DS-3 data signal, which is timed by a 44.736 MHz DS-3 clock signal, is to be carried in a SONET/SDH fiber-optic network, the DS3 signal is mapped into the higher rate SPE of an STS-1, and extra bits must be added to the DS-3 signal prior to transmission through the SONET/SDH network. These extra bits are commonly referred to as stuff bits or gap bits, and are place markers and may, or may not carry valid data. These gap bits are required because the DS-3 signal is slower than the SONET/SDH clock frequency, so that there are not enough DS-3 bits at the higher frequency to form a complete SONET frame. More detail may be found in the Bellcore specification "SONET Transport Systems: Common Generic Criteria", GR-253-CORE, Issue 3, September 2000, the Bellcore specification "Transport Systems Generic Requirements (TSGR): Common Requirements", GR-499-CORE, Issue 2, December 1998, and the ITU-T Recommendation G.783, "Characteristics of Synchronous Digital Hierarchy (SDH) Equipment Functional Blocks", January 1994.

When the STS-1 is received at a network exit node, the overhead bytes are removed from the SONET STS-1 and replaced by gaps in the data stream. The payload data that remains is de-framed and de-mapped into a data stream carried at a higher clock frequency than the nominal original clock frequency of the payload data. The stuff data that was inserted when the data was mapped into the SPE remains when the data stream is recovered from the SPE, and is also replaced by gaps in the data stream. Thus, the recovered payload data contains gaps in the data stream remaining after the overhead bytes and stuff data bits have been removed. If, for example, DS-3 data has been transported via a SONET/SDH network, the DS-3 data must be converted from the SONET clock signal to the lower frequency DS-3 clock signal and the gap data bits must be removed prior to the DS-3 signal being B3ZS-encoded for electrical re-transmission.

To transfer data from one clock domain to another, for example from the DS-3 embedded within the SONET signal rate to the proper DS-3 signal rate, a desynchronizer is used to provide a buffering mechanism between the clock domains. A desynchronizer typically includes an elastic store first-in-first-out memory buffer that receives gapped data recovered from a synchronized data payload as an input at one clock frequency and stores the data in appropriate storage locations.

Although the SONET/SDH fiber optic network is a synchronous network, variations in clock signals across the network may occur. These variations in clock signals between various network elements may cause a loss of data downstream from the sender if the clock signal at which data is written to the synchronous payload and the clock signal at which the data is read from the synchronous payload are sufficiently different. A variety of conditions can cause variations in clock signals. For example, network clock instability, electrical noise and interference, effective changes in the length of transmission media, changes in the velocity of propagation, Doppler shifts, irregular timing information, and other electrical and network problems may all cause clock variations.

To mitigate the problems caused by clock variations across a network, the SONET/SDH STS-N/STM-N messages are provided with a pointer adjustment mechanism within the transmission overhead bytes that permit some movement of the data within the SPE. The pointer adjustment mechanism includes a pair of bytes, H1 and H2, which identify the start of the next SONET/SDH payload byte and also indicate if the pointer adjustment byte, H3, is to be used. The third overhead byte (H3) provides for active pointer adjustment when a negative justification of the SPE is required. Negative justification involves posting valid data in the H3 byte. Positive justification involves marking the byte after the H3 byte as a dummy or stuff byte. These pointer adjustments allow for eight (8) bits of data to be added to a SONET/SDH message frame (using the H3 overhead byte) or for eight (8) bits to be removed from the frame. This allows for the SPE to be re-framed and re-synched at a network node that has a slightly different network clock. Thus, in addition to the gap data necessary to compensate for payload data that is carried by a different frequency clock signal, eight bits of data may be added or removed at each network element in the network due to clock instability in the network.

Pointer adjustments can be periodic or aperiodic in nature. A periodic pointer adjustment may be caused, for example, when the SPE transporting the data has a constant clock offset at the output node of the network relative to the input node. An aperiodic or non-periodic pointer adjustment may be bursty in nature when caused by a transient problem or condition within the network.

Although the synchronous system may adjust the payload data using pointer adjustments to account for clock and phase variations, the clock and phase shifts caused by the pointer adjustments and/or the de-gapping of the payload data can affect the output rate of the data clock provided by the PLL. Typically, clock and phase shifts have two components. One is a high frequency jitter component that is classified as a clock or phase shift that is greater than, or equal to 10 Hz. A second is a low frequency wander component that is classified as a clock or phase shift that is less than 10 Hz.

Jitter refers to the phase variations in the clock signal, which may cause errors in identifying bit positions and values accurately, and is therefore an issue in synchronous systems. The jitter requirement for SONET can be found in the ANSI document "Synchronous Optical Network (SONET)—Jitter at Network Interfaces", ANSI-T1.105.03-1994. Wander refers to phase variations that typically affect the frame and time-slot synchronization. The wander requirement for SONET can be found in the ANSI document "Synchronous Optical Network (SONET)—Jitter at Network Interfaces—DS3 Wander Supplement", ANSI-T1.105.03b-1997. Each network element adds some amount of noise to the SPE that eventually contributes to the timing instability in the form of jitter and wander in the recovered payload signal.

As is known, the PLL used to recover the smooth clock signal and smooth data signal is able to smooth out some phase jumps caused by pointer adjustments or asynchronous stuff bits. A PLL is most effective at filtering out high frequency jitter components, i.e., those with a frequency greater than 10 Hz, but is less effective at filtering out the low frequency wander components. Since, typically the wander components are much less than 10 Hz, these wander components are well within the bandwidth of the PLL and are passed without being attenuated. To construct a PLL with a small enough bandwidth to filter the wander components of the phase jumps, large time constants in the PLL control loops would require large component values for the resistors and capacitors used in the PLL. In addition, the large time constants required would result in a PLL that is slow to lock onto the reference signal and would cause long delays in recovering lock after a transient event.

One source of wander errors in the output data rate can be caused by the pointer adjustments within the synchronous signals. Each pointer adjustment signal or asynchronous gap data results in a data gap for a given number of clock cycles. For example, an 8-bit pointer adjustment that occurs once a second or less, is a low frequency change in the data rate.

When a pointer adjustment is received however, there are eight bits that are added to the elastic store, or skipped, and not written to the elastic store. The inconsistent nature of the gapped data can result in large changes in the data output rate. The ratio between the input data rate and the output data rate may change by a value sufficiently large that the elastic store can experience a data overflow condition or a data underflow condition. Data overflow occurs when data is written to the elastic store at a faster rate than usual, or read at a slower rate than usual, causing the elastic store to accumulate data. In these conditions, the elastic store may be unable to store all of the incoming data, and data may be lost. Similarly, data underflow occurs when data is written to the elastic store at a slower rate than usual, or read at a faster rate than usual, causing the elastic store to lose data. In this circumstance no data is read from the elastic store.

Typically, the elastic store used in the desynchronizer has a write/read control system that attempts to maintain the output data rate at a specified rate, and maintain the elastic store at a predetermined fill level. If the elastic store begins to overfill, the write/read control system increases the data output rate of the elastic store until the proper storage level in the elastic store is reached. Once the proper storage level is reached, the write/read control system decreases the data output rate. If the elastic store begins to underfill, the write/read control system will decrease the data output rate of the elastic store until the proper storage level in the elastic store is reached. Once the proper level is reached, the write/read control system increases the data output rate.

As noted above, the VT or TU-11/12 pointer bytes V1, V2, and V3 operate in the same manner as the H1, H2, and H3 pointer bytes described herein. Similar problems related to the processing of the VT pointer bytes occur, and the positive justification of the VT pointer bytes is accomplished by assigning the bytes immediately after the V3 bytes as positive stuff opportunity bytes. Negative justification is accomplished by assigning the V3 byte to contain valid data. The frequency and polarity of the pointer adjustments to the VT pointer bytes is uncorrelated to the frequency of the pointer adjustments made by the SONET/SDH H1-H2-H3 pointer bytes. In addition, the wander and jitter associated with the pointer adjustments is also uncorrelated between the transport overhead pointer bytes and the VT overhead pointer bytes.

The highly non-uniform input data rate to a SONET SPE is primarily due to the presence of transport overhead (TOH) and the position of data bits and stuff bits in the SONET SPE. The TOH data is not provided as output data since the de-mapper in the SONET receiver only provides a write enable signal when valid data from the SPE is present. Thus, there may be long gaps with no data when TOH data is present. As discussed above, stuff bits may be added to the SPE when mapping PDH data into the SONET SPE, to account for different data rates between the PDH data and the SONET data rate. Typically, stuff bits when mapped into the SPE are not valid data and are mapped into known locations. The de-mapper skips over the stuff bits, and a short gap of no data occurs.

A filter and the read enable generator may be used to substantially smooth the non-uniform data input rate. The filter and read enable generator can vary the nominal rate at which read enable signals are generated by controlling stuff opportunities during the data output in which data bits can be added to the nominal data rate, thereby increasing the data rate, or removed from the nominal rate, thereby decreasing the data rate.

The filter and rate enable generator provide an output control word that is indicative of the storage level of tributaries, in preparation for mapping into an SPE. The control word can be the average of the storage level over a predetermined time period, or a value derived from the average or other suitable statistics based on the storage level. For example, the filter may be a low pass filter that averages out fluctuations in the storage level by filtering the high-frequency components to provide the average value, which may be scaled by multiplying it by a predetermined constant, as the control word.

A mapper may be used to map data channels into frames defined by network protocol, where adjacent frames are separated by a frame boundary. For example, PDH tributaries may be mapped into SPEs using SONET protocol.

It would be advantageous if multiple channels of buffer-fill information could be accumulated without parallel sets of hardware for each channel, at a sampling rate less than the system clock.

SUMMARY OF THE INVENTION

The present invention is built upon an evaluation of the frequencies in the system, including: the system clock rate; the data rates to be supported (DS1 and E1, or DS3 and E3); and, the characteristics of the various mapping formats supported for each of those data rates (e.g. VT1.5 and M13 for DS1, and VT2.0 and G.747 for E1). The present invention uses an averaging process for each channel (tributary). Buffer-fill information is received for each channel at Fsys, and averaged over a number of Fsys clock cycles, to produce a higher precision value supplied at a reduced rate Fsample. A filter core accepts buffer-fill sampled at the rate Fsample. A stuff rate generator takes the filter output and directly drives the stuff control bits in the mapper. Fsample is chosen so that the system processes all the channels without falling behind the rate at which the mapper requires stuff control inputs, which is once per superframe in the case of VT1.5, for example. The entire system operates such that the rate recovery for each channel is stable and the filtering is adequate to ensure that the mapping is performed in a manner that satisfies transmission standards. By timesharing the filter block, the present invention is able to reduce the number of gates required.

Accordingly, a sampled accumulation method is provided for mapping information into Synchronous Payload Envelopes (SPEs). The method buffers data from a plurality of tributaries, and sequentially stores buffer-fill information for each tributary in a first memory, at a rate of up to one tributary per system clock (Fsys) cycle. A stored accumulation of buffer-fill information for each tributary is updated at a sample rate frequency (Fsample), where Fsample≦Fsys. The stored accumulation of buffer-fill information is used to calculate stuff bit opportunities for each tributary. As a result, the rate of data being mapped into outgoing tributaries is regulated, and the outgoing mapped tributaries are combined in a SPE.

More specifically, data from up to (n×m) tributaries is buffered, and buffer-fill information in the form of a multi-bit word is stored in a first (n×m) memory array in which each location stores one word of buffer fill data from one tributary. The stored accumulation of buffer-fill information is updated at a rate of Fsample=Fsys/n. For example, in a single Fsys cycle, m buffer-fill information words are read from the first memory array. Also read are m buffer-fill averaged information words stored in a second (n×m) memory array, where the bit-width of the averaged information may be different from that of the input buffer-fill word stored in the first memory array. The m buffer-fill information words are accumulated with the m buffer-fill averaged information words, and m new buffer-fill averaged information words are stored in the second memory array. By iteratively accumulating m buffer-fill information words with m buffer-fill averaged information words, and storing m new buffer-fill averaged information words per Fsys cycle, all the tributaries can be sampled in a total of n Fsys cycles.

Additional details of the above-described method and a sampled accumulation system for mapping information into an SPE are provided below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Although the apparatus described herein has application to any synchronous communication system, exemplary aspects of the invention are presented below in the context of a synchronous optical network (SONET) receiver and desynchronizer.

Figure 1:
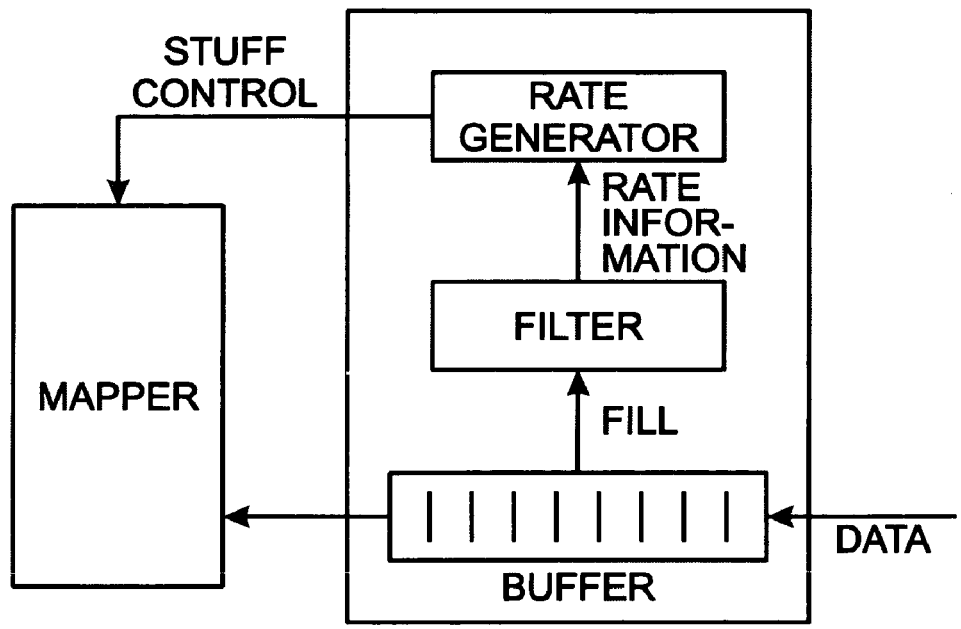
FIG. 1 is a schematic block diagram of a digital jitter attenuator.

FIG. 1 is a schematic block diagram of a digital jitter attenuator. A digital jitter attenuator typically consists of a buffer, a filter, and a rate generator, as shown. The hardware may be replicated for each channel, because each channel needs one buffer. This solution is sufficient for low-density applications, such as 12-28 channels (e.g., 12 DS3s in one STS-12, or 28 DS1s in one STS-1). In this system, buffer-fill information is sent from the buffer to the filter. The filter determines the rate at which the buffer is being filled with data. The rate generator calculates the rate at which the channel must be mapped into an SPE. The rate is manipulated through the use of stuff bit opportunities.

Figure 2:
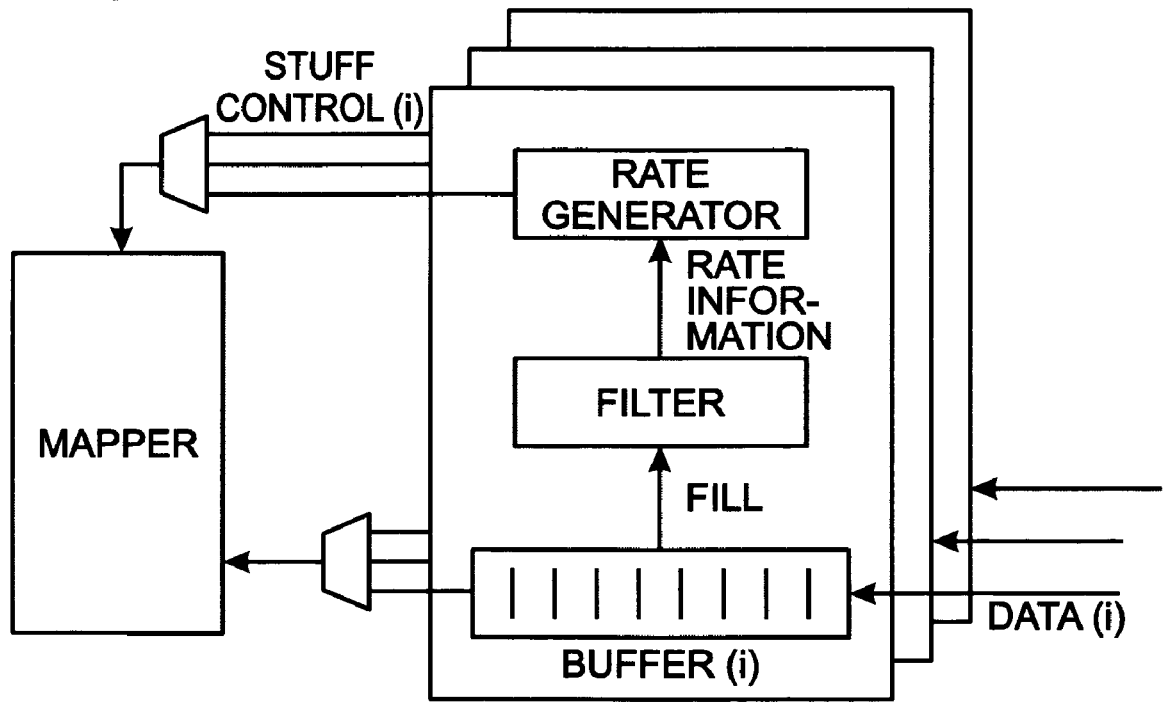
FIG. 2 is a schematic block diagram of a multiple channel jitter attenuator.

FIG. 2 is a schematic block diagram of a multiple channel jitter attenuator. A representative size for a one-channel implementation is 10 k gates, so a 12DS3s implementation would be 120 k gates in size, and for 28DS1s would be 280 k gates in size. As the number of channels increases, the gate count rapidly prohibits a simple replication of parallel channel hardware. For example, a device with STS-12 capacity and support for up to 336 DS1s, would require 3.4M (million) gates for one direction, and to support for bidirectional traffic would require 7M gates.

Figure 3:
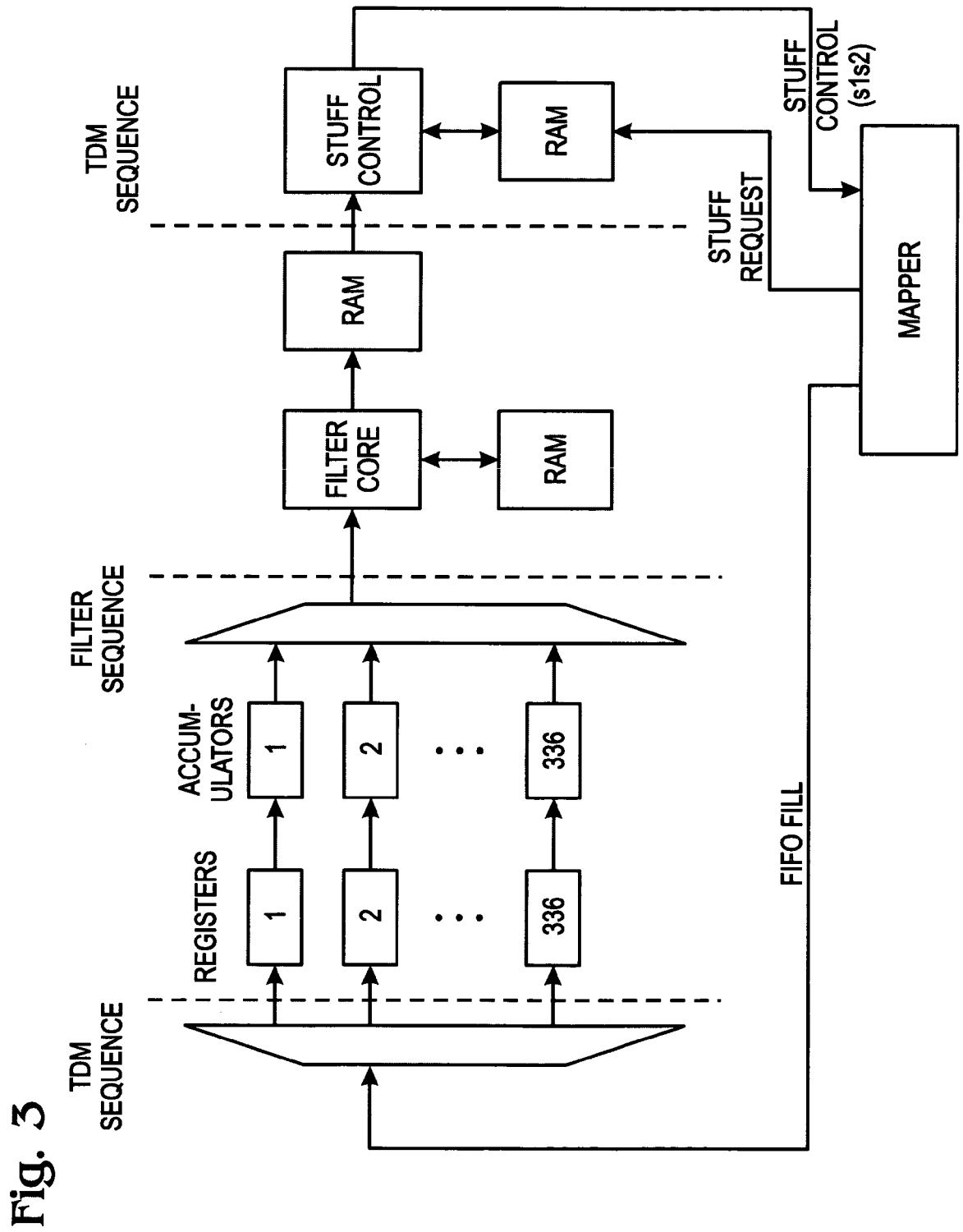
FIG. 3 is a schematic block diagram of a high density timeshared jitter attenuation filter.

FIG. 3 is a schematic block diagram of a high density timeshared jitter attenuation filter. To reduce the gate count, a timeshared channel implementation can be used. The design consists of multiple buffers, one per channel. Data enters and leaves the buffer on a system clock, so the fill of the buffer can change at most each system clock. Therefore, by reading the fill of the buffer every system clock cycle, no information is lost. The buffer-fill information is available at the system clock rate Fsys. Conventionally, the buffer-fill information is processed by a filter at a sampling rate Fsample=Fsys. This sampling rate requires one filter block per input. The design of FIG. 3 greatly reduces the amount of hardware needed to process multiple channels, but the multiplexed accumulators must be operated using a sampling rate equal to the system clock Fsys.

Figure 4:
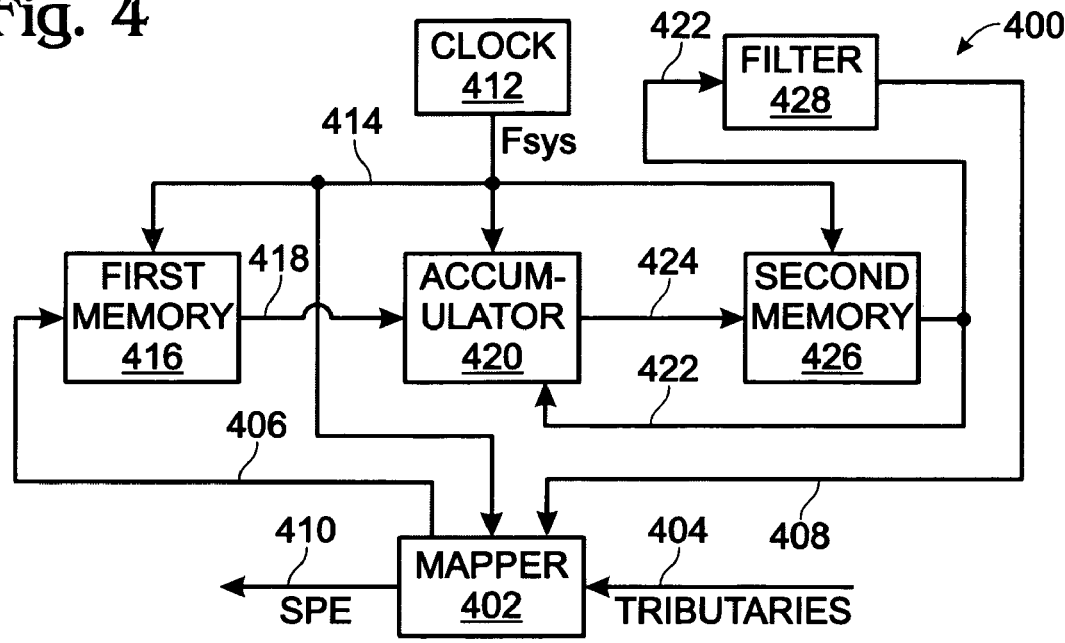
FIG. 4 is a schematic block diagram of a sampled accumulation system for mapping information into Synchronous Payload Envelopes (SPEs).

FIG. 4 is a schematic block diagram of a sampled accumulation system for mapping information into Synchronous Payload Envelopes (SPEs). The system 400 comprises a mapper 402 having an input on line 404 to accept a plurality of tributaries, and an output on line 406 to supply buffer-fill information for each tributary. The mapper 402 has an input on line 408 to accept stuff bit opportunity information for regulating the rate of data being mapped into outgoing tributaries, and an output on line 410 to supply the outgoing mapped tributaries combined in an SPE.

A clock 412 has an output on line 414 to supply a system clock frequency (Fsys). A first memory 416 has an input on line 406 to sequentially write buffer-fill information for each tributary, at a rate of up to one tributary per Fsys cycle, and an output on line 418 for supplying stored buffer-fill information. Note, this aspect of the system assumes that memory 416 is able to write information on a word-by-word basis, one word pre Fsys clock cycle.

An accumulator 420 has an input on line 418 to read the stored buffer-fill information from the first memory, and an input on line 422 to read a stored accumulation of buffer-fill information. The accumulator 420 has an output on line 424 to supply accumulated buffer-fill information at a sample frequency rate (Fsample), where Fsample≦Fsys.

A second memory 426 has an input on line 424 to write the accumulated buffer-fill information, and an output on line 422 to supply the stored accumulation of buffer-fill information. A filter 428 has an input on line 424 to read the accumulated buffer-fill information, and an output on line 408 to supply stuff bit opportunities to the mapper for each tributary. Generally, the filter 428 determines the width of the data word being buffered for each tributary, and generates rate commands for mapping the buffered tributaries. Using the rate commands on line 408, the mapper 402 determines when stuff bits must be used.

Figure 5:
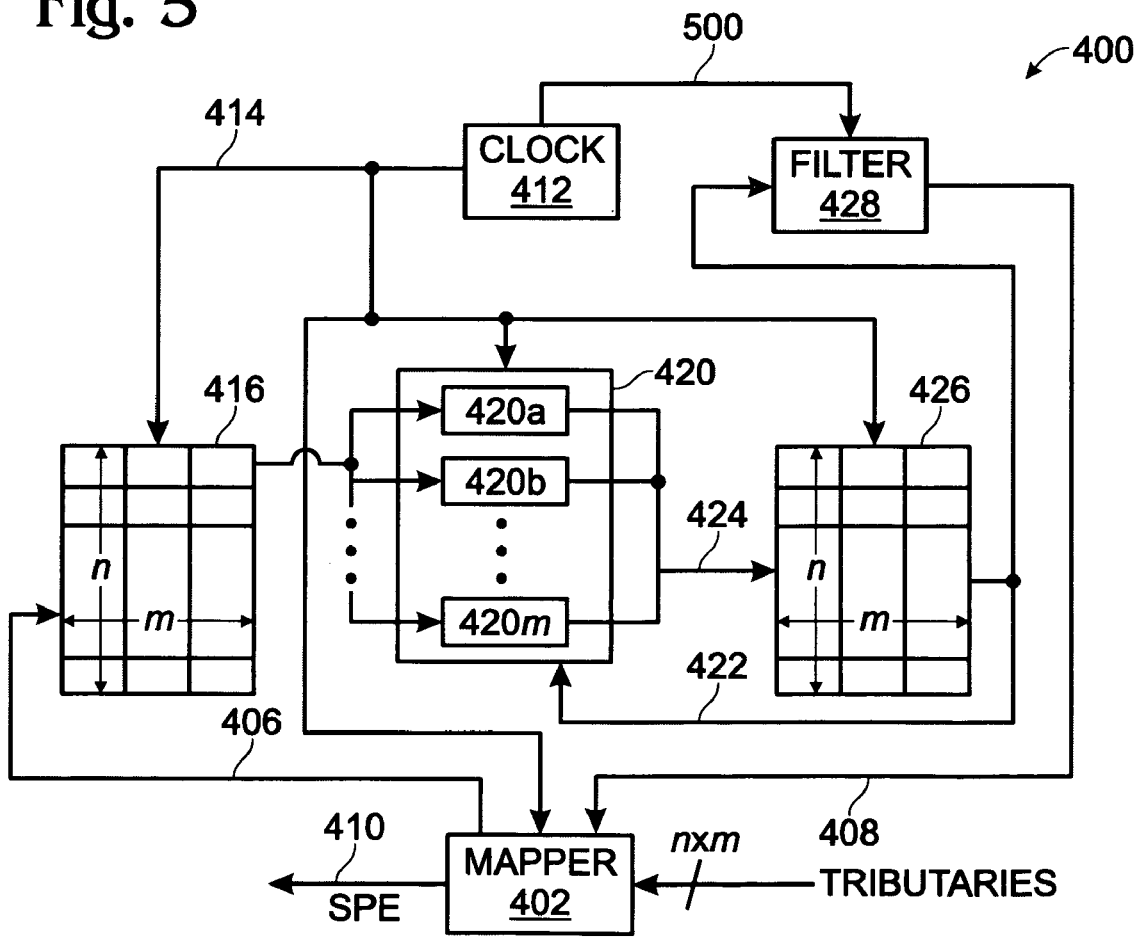
FIG. 5 is a schematic block diagram depicting a more detailed aspect of the system shown in FIG. 4.

FIG. 5 is a schematic block diagram depicting a more detailed aspect of the system shown in FIG. 4. As shown, the mapper 402 accepts up to (n×m) tributaries, and the first memory 416 stores buffer-fill information words in a (n×m) memory array. Thus, the accumulator 420 supplies accumulated buffer-fill information for each tributary at a rate of Fsample=Fsys/n. Here, the accumulator is depicted as a set of m parallel accumulators.

More particularly, the accumulator 420 supplies accumulated buffer-fill information at the rate of Fsample, as follows. In a single Fsys cycle, m buffer-fill information words are read from the first memory array 416. Also read (in the same cycle) are m buffer-fill averaged information words stored in the second memory (n×m) array. In the same cycle, the m buffer-fill information words are accumulated with the m buffer-fill averaged information words, and m new buffer-fill averaged information words are supplied to the second memory array 426. Note, the bit-width of the averaged information stored in the second memory may be different from that of the input buffer-fill word stored in the first memory array.

Thus, the accumulator 420 updates the stored accumulation of buffer-fill information for (n×m) tributaries by iteratively accumulating m buffer-fill information words with m buffer-fill averaged information words, and supplying m new buffer-fill averaged information words per Fsys clock cycle, in a total of n Fsys clock cycles.

In one aspect, the clock 412 supplies a filter clock frequency (Ffilter) on line 500, where Ffilter=Fsys/P. The filter 428 accepts up to one buffer-fill averaged information word per (P/(n×m))Fsys clock cycles, and calculates stuff bit opportunities for one tributary per (P/(n×m))Fsys clock cycles. Thus, the filter 428 calculates (n×m) stuff bit opportunities, one stuff bit opportunity per (P/(n×m))Fsys clock cycles, over one Ffilter clock cycle.

Figure 6:
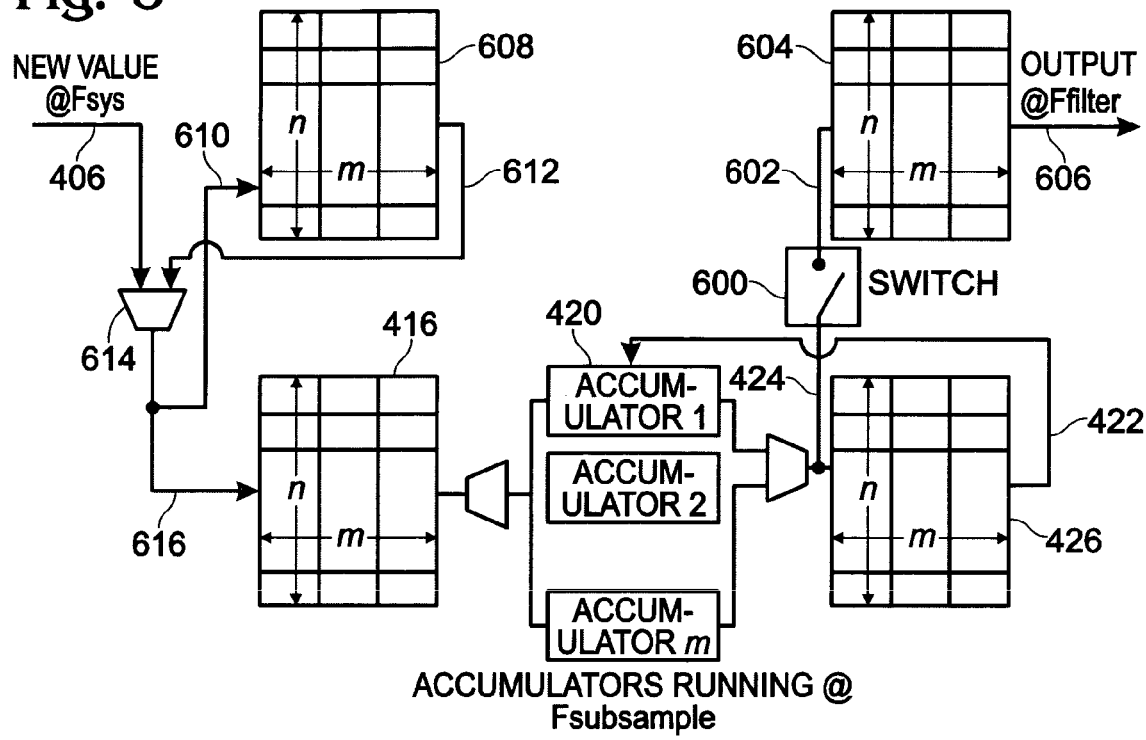
FIG. 6 is a schematic block diagram depicting a second variation of the system shown in FIG. 4.

FIG. 6 is a schematic block diagram depicting a second variation of the system shown in FIG. 4. In this aspect a switch 600 has an input connected the accumulator output on line 424, and an output on line 602 to supply m buffer-fill averaged information words per (P/n) Fsys clock cycles. In the event that the second memory does not permit two simultaneous independent reads from the array, a third (n×m) memory array 604 may be used that has an input connected to the switch output on line 602 for storing the m new buffer-fill averaged information words, and an output connected to the filter on line 606 for supplying at least one buffer-fill averaged information word per (P/(n×m))Fsys clock cycles.

A fourth (n×m) memory array 608 has an input on line 610 to write buffer-fill information words and an output on line 612 to supply stored buffer-fill information words. A multiplexer 614 has an input connected to the mapper (not shown) on line 406 to receive up to one new buffer-fill information word per Fsys clock cycle. The multiplexer 614 has an input on line 612 to receive a group of m buffer-fill information words from the fourth memory array 608, and an output on line 610 to supply a group of m new buffer-fill information words to the first memory array 416 and fourth memory array 608 for simultaneous storage.

The multiplexer 614 replaces a previously stored information byte in the group, with the new buffer-fill information word from the mapper, and creates the new group of m buffer-fill information words. The multiplexer 614 iteratively creates one new group of m buffer-fill information words per Fsys clock cycle, and supplies new groups of m buffer-fill information words to the first and fourth memory arrays 416/608, in a total of (n×m) Fsys cycles.

In the event the first memory 416 permits partial writes, whereby an incoming buffer-fill information word can be written into any location in an m-wide row of words, memory 608 and multiplexer 614 are not needed. In the event the first memory 416 does not permit partial writes, but permits two simultaneous independent reads from different locations, then memory 608 is not needed but multiplexer 614 is needed.

Figure 7:
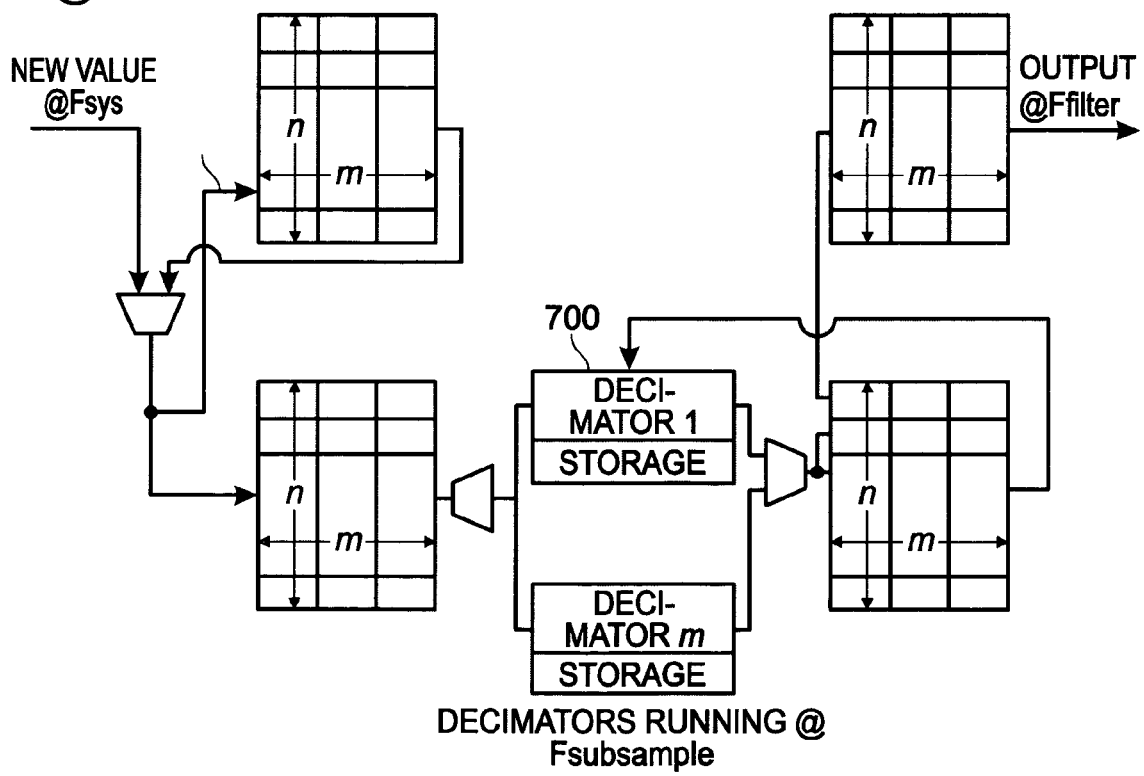
FIG. 7 is a schematic block diagram depicting a third variation of the system shown in FIG. 4.

FIG. 7 is a schematic block diagram depicting a third variation of the system shown in FIG. 4. In this aspect, a decimator 700 is represented as a set of m parallel decimators. A decimator, or decimation filter is a device capable of performing processes and arithmetic operations, beyond the accumulating function described above. For example, the decimators may be an FIR or IIR filter. Typically, the decimator performs at least one arithmetic operation involving the stored accumulation of buffer-fill information and supplies accumulated buffer-fill information responsive to the arithmetic operation. In other aspects, the decimator performs operations involving the current data and previously stored data. As shown, the individual decimators may include local memory, to aid in the processing.

Figure 8:
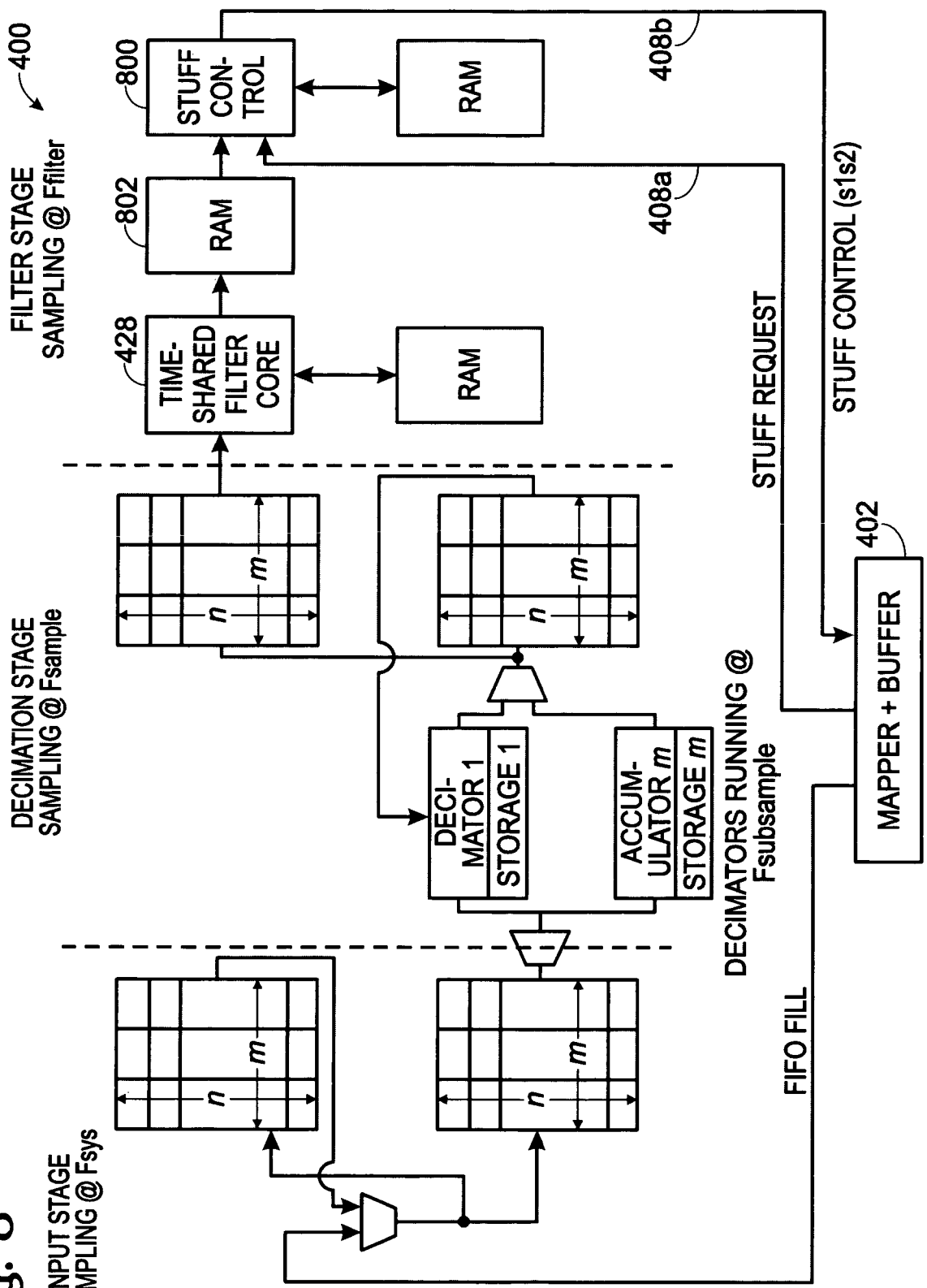
FIG. 8 is a schematic block diagram depicting a variation of the system shown in FIG. 7, with additional details.

FIG. 8 is a schematic block diagram depicting a variation of the system shown in FIG. 7, with additional details. As shown, the filter 428 provides rate information to a stuff control module 800, via RAM 802. Stuff bit requests are made on line 408a and control information is received on line 408b.

Although all the elements depicted is FIGS. 4 through 8 are explained as hardware components, it should be understood that in some aspects all, or part of the element functions can be enabled using a stored set of software instructions, which can be accessed and implemented using a microprocessor.

Functional Description

The above described system is targeted towards data mapping into SONET as opposed to SONET transport applications that involve demapping the PDH data from SONET and remapping it back into SONET (although it is used in those applications as well). Although a DS1 into VT case is described, it should be understood that other implementations are similar in concept. In data mapping applications, there is no crossing of SONET clock domains (i.e., from the incoming domain from which data is demapped, back into the SONET clock domain into which data is remapped) and the wander budget for the mapped PDH signal can be greater than one bit. In addition, in applications that map an incoming packet stream into SONET, although the incoming packet stream is not synchronous to the outgoing VT rate, it is typically also slower because the packet sizes are much larger than 1 byte. Therefore, it is possible to relax the input sampling requirement and sample at a lower rate, Fsample.

The reduced sampling rate (Fsample) permits a modified input structure that places the input values into a RAM instead of a flop-based register. This results in the constraint that the value cannot be read out each cycle. As shown in FIG. 6 for example, incoming buffer-fill values are written into a dual-port RAM (416) that is m-entries wide, where m depends on Fsys/Fsample, and the total number of tributaries. If RAM is used that does not support bit-field writes, the entries have to be duplicated in another RAM (608). As shown in FIG. 5, the duplicate RAM 608 can be eliminated if partial writes are allowed in the RAM. Returning to FIG. 6, at each clock cycle a new buffer-fill value for a unique tributary number is available. This buffer-fill information for the tributaries is ordered to follow a predetermined sequence. The duplicate value from memory 608 is, therefore, read in a look-ahead fashion. The entry corresponding to the new input is modified, and the updated row of m words is written back into both the primary (416) and the shadow (608) storage.

Each RAM is m entries wide by n deep. Further, there are up to (n×m) tributaries, and n=Fsys/Fsample. On the read side of RAM1 (416), one row of m entries is read in one Fsys clock cycle and fed to m accumulators (or m decimators, see FIG. 7). The decimation ratio P=Fsys/Ffilter. P does not necessarily equal n, therefore, Ffilter need not be the same as Fsample.

In the simpler implementation that uses only an averager (FIG. 6), the averaging is accomplished over P·Ffilter clock cycles. On each Fsys clock cycle, m entries are read from the second memory 426, each entry is accumulated in one of the m accumulators, and written back into the second memory. The final accumulated value, after P·Ffilter clock cycles, is written into the third memory 604, with or without scaling depending on system requirements.

In the specialized implementation using decimators (FIG. 7), the structure is similar to FIG. 6, except more storage (RAMs or registers) may be required to store decimator intermediate values. Each decimator can be pipelined to process successive samples concurrently.

The sampling accumulator input stage described above, together with the timeshared filter constitutes a high-density multirate filter suitable for processing a large number of channels. Together with data buffers and output stuff rate generator, the entire system constitutes a high-density digital jitter attenuator.

For example, assuming that m=4 and n=3, there are 12 tributaries, which can be numbered t(1,1) through t(4,3). Each Fsys clock cycle, one row of entries is read from the first memory into the accumulator. If row1 (n=1) is read, then the following tributaries are loaded in the accumulators: t(1,1), t(2,1), t(3,1), and t(4,1). The accumulator adds this new buffer-fill information with the running sum for those same tributaries, which is stored in the second memory. In the same Fsys clock cycle, the results are put back into row1 of the second memory.

Then, in the next Fsys clock cycle, the next row is loaded (n=2) into the accumulators, which includes the following tributaries: t(1,2), t(2,2), t(3,2), and t(4,2). The buffer-fill information for these tributaries is updated and loaded into row2 of the second memory. In the next Fsys clock cycle, this process is repeated for row3. The fourth Fsys clock cycle returns to row1. In this example Fsys/Fsample=n=3, because the process is repeated every 3 Fsys clock cycles.

As noted above, Ffilter need not be equal to either Fsys or Fsample, and is typically a lower frequency. The accumulator can accumulate (or the decimator can filter) for a number of samples (multiple Fsample clock cycles), before writing the result into the third memory. That ratio between Fsample and Ffilter is decided by how many clock cycles are available to do the processing by the filter.

In another aspect, the decimators may need more than one Fsys clock cycle to perform their arithmetic operation. For example, if 2 Fsys clock cycles are required, then a pipelined decimator may be used. The second memory would be updated for row1 one clock cycle "behind" when the data is read from the first memory, but would otherwise remain in sync. So, the decimators would continue to use n Fsys clock cycles, but with a pipeline, and the first stage of the decimator would still get loaded with a fresh row from RAM1 each clock cycle.

Figure 9A:
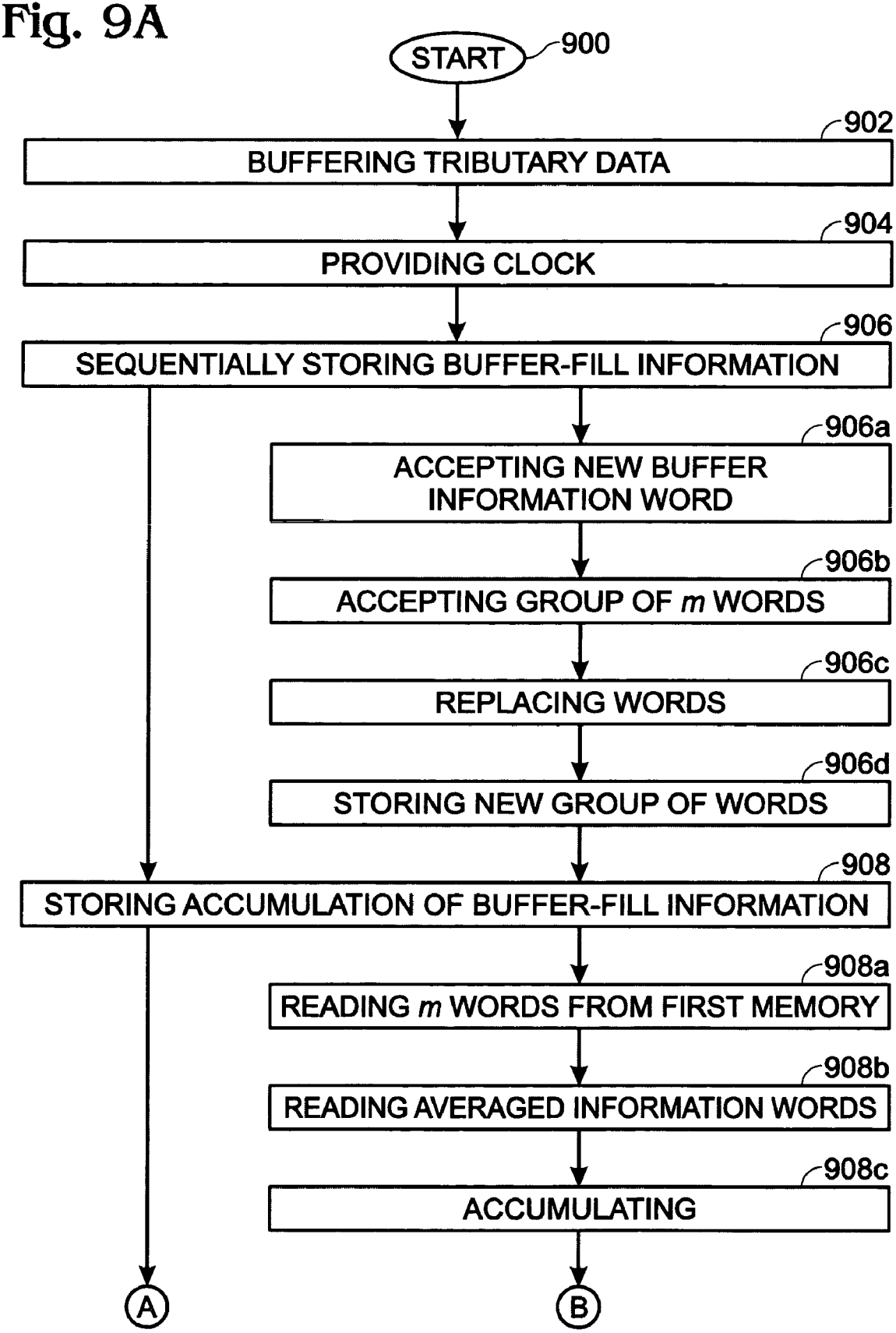
FIGS. 9A and 9B are flowcharts illustrating a sampled accumulation method for mapping information into SPEs.
Figure 9B:
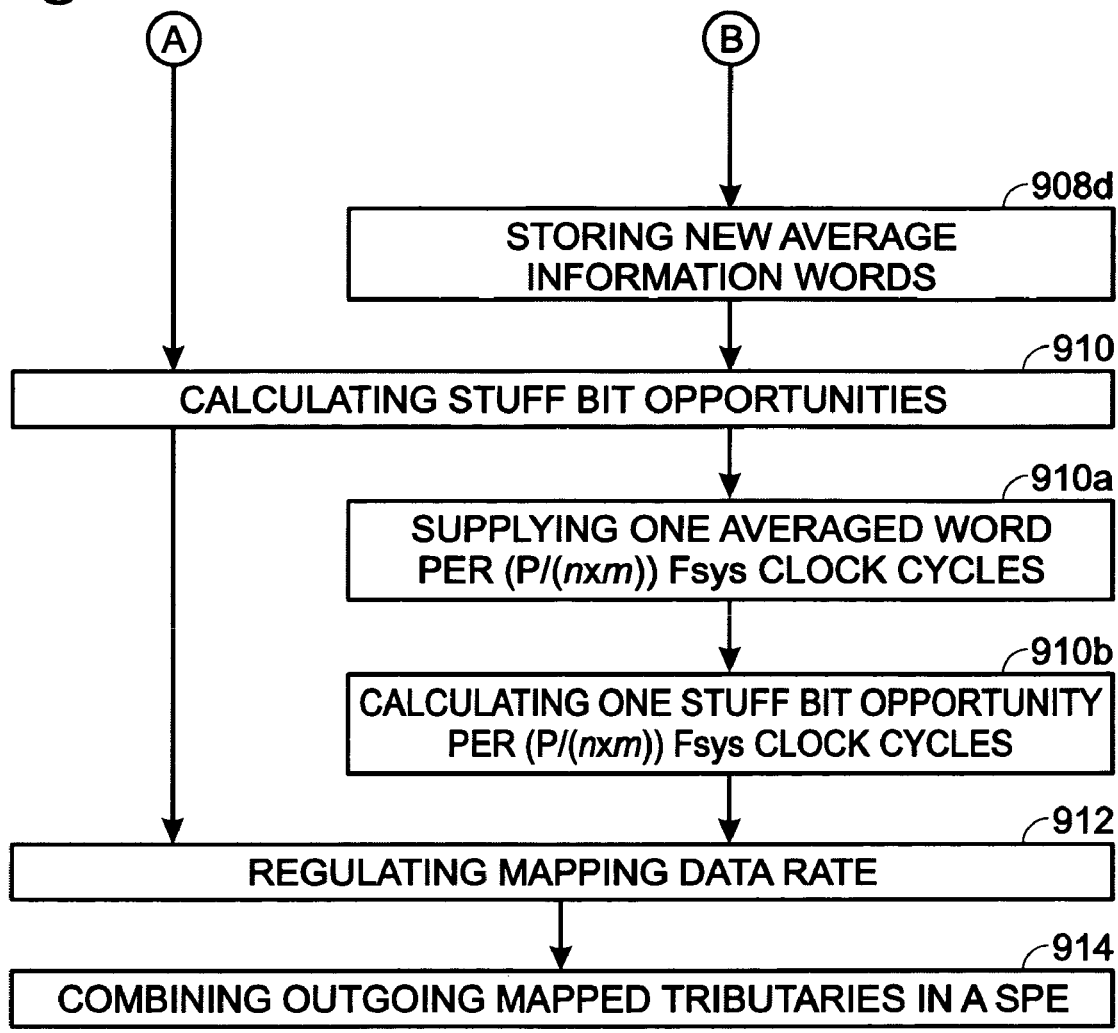

FIGS. 9A and 9B are flowcharts illustrating a sampled accumulation method for mapping information into SPEs. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 900.

Step 902 buffers data from a plurality of tributaries. Step 904 provides a clock with a system clock frequency (Fsys). In a first memory, Step 906 sequentially stores buffer-fill information for each tributary, at a rate of up to one tributary per Fsys cycle. Step 908 updates a stored accumulation of buffer-fill information for each tributary at a sample rate frequency (Fsample), where Fsample≦Fsys. Step 910 uses the stored accumulation of buffer-fill information to calculate stuff bit opportunities for each tributary. Step 912 regulates the rate of data being mapped into outgoing tributaries, and Step 914 combines the outgoing mapped tributaries in a SPE.

In one aspect, buffering data from the plurality of tributaries in Step 902 includes accepting up to (n×m) tributaries. Then, sequentially storing buffer-fill information for each tributary in Step 906 includes storing buffer-fill multi-bit information words in a first (n×m) memory array.

In another aspect, updating the stored accumulation of buffer-fill information for each tributary in Step 908 includes updating at a rate of Fsample=Fsys/n. In a single Fsys cycle, Step 908a reads m buffer-fill information words from the first memory array, and Step 908b reads m buffer-fill averaged information words stored in a second (n×m) memory array. In the same Fsys cycle, Step 908c accumulates the m buffer-fill information words with the m buffer-fill averaged information words, and Step 908d stores m new buffer-fill averaged information words in the second memory array. In this manner, the stored accumulation of buffer-fill information for (n×m) tributaries can be updated by iteratively accumulating m buffer-fill information words with m buffer-fill averaged information words, and storing m new buffer-fill averaged information words per Fsys cycle, in a total of n Fsys cycles.

In a different aspect, Step 904 additionally provides a clock with a filter frequency (Ffilter), where Ffilter=Fsys/P. Then, using the stored accumulation of bytes to calculate stuff byte opportunities in Step 910 includes substeps. Step 910a supplies up to one buffer-fill averaged information word per (P/(n×m))Fsys clock cycles. Step 910b calculates stuff byte opportunities for one tributary per (P/(n×m))Fsys clock cycles. Thus, (n×m) stuff bit opportunities are calculated, one stuff bit opportunity per (P/(n×m))Fsys clock cycles, over one Ffilter clock cycle.

In one aspect, storing the m new buffer-fill averaged information words in the second memory array (Step 908d) includes storing the m new buffer-fill averaged information words in a third memory array per (P/n)Fsys clock cycles. Then, supplying the one buffer-fill averaged information word per (P/(n×m))Fsys clock cycles in Step 910a includes reading at least one buffer-fill averaged information word from the third memory array per (P/(n×m))Fsys clock cycles.

In another aspect, sequentially storing buffer-fill information for each tributary in a first memory (Step 906) includes substeps. In a single cycle of Fsys, Step 906a accepts a new buffer-fill information word. Step 906b accepts a group of m buffer-fill information words from a fourth (n×m) memory array. In the same Fsys clock cycle, Step 906c replaces one of the buffer-fill information words from the group with the new buffer-fill information word, creating a new group of m buffer-fill information words. Step 906d simultaneously stores the new group of m buffer-fill information words in the first and fourth memory arrays. Thus, a new group of m buffer-fill information words is iteratively created every Fsys clock cycle, and the new groups of m buffer-fill information words are stored in the first and fourth memory arrays, in a total of (n×m) Fsys cycles.

In a different aspect, updating the stored accumulation of buffer-fill information for each tributary at the Fsample rate (Step 908) includes performing at least one arithmetic operation involving the stored accumulation of buffer-fill information, supplying an updated accumulation of buffer-fill information responsive to the arithmetic operations. These operations may include filtering, and may be performed by a decimator or decimation filter.

A system and method have been provided for mapping information into SPEs using an averaging process. Some exemplary block diagram circuitry and process details have been presented to illustrate the invention. However, the invention is not limited to merely these examples. Other variations and embodiments of the invention will occur to those skilled in the art.

We claim:

1. A sampled accumulation method for mapping information into Synchronous Payload Envelopes (SPEs), the method comprising:
   buffering data from up to (n×m) tributaries;
   providing a clock with a system clock frequency (Fsys);
   in a first memory, sequentially storing buffer-fill information words for each tributary in a first (n×m) memory array, at a rate of up to one tributary per Fsys cycle;
   updating a stored accumulation of buffer-fill information for each tributary at a sample rate frequency (Fsample) =Fsys/n, where Fsample≦Fsys;
   using the stored accumulation of buffer-fill information to calculate stuff bit opportunities for each tributary;
   regulating the rate of data being mapped into outgoing tributaries; and,
   combining the outgoing mapped tributaries in a SPE.

2. The method of claim 1 wherein updating the stored accumulation of buffer-fill information at the rate of Fsample includes:
   in a single Fsys cycle, reading m buffer-fill information words from the first memory array;
   reading m buffer-fill averaged information words stored in a second (n×m) memory array;
   accumulating the m buffer-fill information words with the m buffer-fill averaged information words; and,
   storing m new buffer-fill averaged information words in the second memory array.

3. The method of claim 2 wherein updating the stored accumulation of buffer-fill information at the rate of Fsample includes updating the stored accumulation of buffer-fill information for (n×m) tributaries by iteratively accumulating m buffer-fill information words with m buffer-fill averaged information words, and storing m new buffer-fill averaged information words per Fsys cycle, in a total of n Fsys cycles.

4. The method of claim 3 wherein providing the clock includes providing a clock with a filter frequency (Ffilter), where Ffilter=Fsys/P;
   wherein using the stored accumulation of buffer-fill information to calculate stuff byte opportunities includes:
      supplying up to one accumulated buffer-fill information word per (P/(n×m))Fsys clock cycles; and,
      calculating stuff byte opportunities for one tributary per (P/(n×m))Fsys clock cycles.

5. The method of claim 4 wherein using the stored accumulation of buffer-fill information to calculate stuff bit opportunities includes calculating (n×m) stuff bit opportunities, one stuff bit opportunity per (P/(n×m))Fsys clock cycles, over one Ffilter clock cycle.

6. The method of claim 4 wherein storing the m new buffer-fill averaged information words in the second memory array includes storing the m new buffer-fill averaged information words in a third memory array per (P/n)Fsys clock cycles; and,
   wherein supplying the one buffer-fill averaged information word per (P/(n×m))Fsys clock cycles includes reading at least one buffer-fill averaged information word from the third memory array per (P/(n×m))Fsys clock cycles.

7. The method of claim 1 wherein sequentially storing buffer-fill information for each tributary in a first memory includes:
   in a singe cycle of Fsys, accepting a new buffer-fill information word;
   from a fourth (n×m) memory array, accepting a group of m buffer-fill information words;
   replacing one of the buffer-fill information words from the group with the new buffer-fill information word, creating a new group of m buffer-fill information words; and,
   simultaneously storing the new group of m buffer-fill information words in the first and fourth memory arrays.

8. The method of claim 7 wherein sequentially storing buffer-fill information for each tributary in a first memory includes iteratively creating a new group of m buffer-fill information words every Fsys clock cycle, and storing the new groups of m buffer-fill information words in the first and fourth memory arrays, in a total of (n×m) Fsys cycles.

9. The method of claim 1 wherein updating the stored accumulation of buffer-fill information for each tributary at the Fsample rate includes:
   performing at least one arithmetic operation involving the stored accumulation of buffer-fill information; and,
   supplying an updated accumulation of buffer-fill information responsive to the arithmetic operations.

10. A sampled accumulation system for mapping information into Synchronous Payload Envelopes (SPEs), the system comprising:
   a mapper having an input to accept a plurality of tributaries, an output to supply buffer-fill information, an input to accept stuff bit opportunity information, for regulating the rate of data being mapped into outgoing tributaries, and an output to supply the outgoing mapped tributaries combined in an SPE;
   a clock having an output to supply a system clock frequency (Fsys);
   a first memory having an input to sequentially write buffer-fill information for each tributary, at a rate of up to one tributary per Fsys cycle, and an output for supplying stored buffer-fill information;
   an accumulator having an input to read the stored buffer-fill information from the first memory, an input to read a stored accumulation of buffer-fill information, and an output to supply accumulated buffer-fill information at a sample frequency rate (Fsample), where Fsample≦Fsys;
   a second memory having an input to write the accumulated buffer-fill information, and an output to supply the stored accumulation of buffer-fill information; and,
   a filter having an input to read the accumulated buffer-fill information, and an output to supply snuff bit opportunities to the mapper for each tributary.

11. The system of claim 10 wherein the mapper accepts up to (n×m) tributaries; and,
wherein the first memory stores buffer-fill information words in a (n×m) memory array.

12. The system of claim 11 wherein the accumulator supplies accumulated buffer-fill information for each tributary at a rate of Fsample=Fsys/n.

13. The system of claim 12 wherein the accumulator supplies accumulated buffer-fill information at the rate of Fsample, as follows:
in a single Fsys cycle, reading m buffer-fill information words from the first memory array;
reading m buffer-fill averaged information words stored in the second memory (n×m) array;
accumulating the m buffer-fill information words with the m buffer-fill averaged information words; and,
supplying m new buffer-fill averaged information words to the second memory array.

14. The system of claim 13 wherein the accumulator updates the stored accumulation of buffer-fill information for (n×m) tributaries by iteratively accumulating m buffer-fill information words with m buffer-fill averaged information words, and supplying m new buffer-fill averaged information words per Fsys clock cycle, in a total of n Fsys clock cycles.

15. The system of claim 14 wherein the clock supplies a filter clock frequency (Ffilter), where Ffilter=Fsys/P; and,
wherein the filter accepts up to one buffer-fill averaged information word per (P/(n×m))Fsys clock cycles, and calculates stuff bit opportunities for one tributary per (P/(n×m))Fsys clock cycles.

16. The system of claim 15 wherein the filter calculates (n×m) stuff bit opportunities, one stuff bit opportunity per (P/(n×m))Fsys clock cycles, over one Ffilter clock cycle.

17. The system of claim 15 further comprising:
a switch having an input connected the accumulator output, and an output supplying m buffer-fill averaged information words per (P/n) Fsys clock cycles; and,
a third (n×m) memory array having an input connected to the switch output for storing the m buffer-fill averaged information words, and an output connected to the filter for supplying at least one accumulated buffer-fill information word per (P/(n×m))Fsys clock cycles.

18. The system of claim 10 further comprising:
a fourth (n×m) memory array having an input to write buffer-fill information words and an output to supply stored buffer-fill information words; and,
a multiplexer having an input connected to the mapper to receive up to one new buffer-fill information word per Fsys clock cycle, an input to receive a group of m buffer-fill information words from the fourth memory array, and an output to supply a group of m new buffer-fill information words to the first and fourth memory arrays for simultaneous storage, where a previously stored information word in the group is replaced with the new buffer-fill information word, creating the new group of m buffer-fill information words.

19. The system of claim 18 wherein the multiplexer iteratively creates one new group of m buffer-fill information words per Fsys clock cycle, and supplies new groups of m buffer-fill information words to the first and fourth memory arrays, in a total of (n×m) Fsys cycles.

20. The system of claim 10 wherein the accumulator is a decimation filter with a processor for performing at least one arithmetic operation involving the stored accumulation of buffer-fill information and to supply accumulated buffer-fill information responsive to the arithmetic operation.

21. A sampled accumulation method for mapping information into Synchronous Payload Envelopes (SPEs), the method comprising:
buffering data from a plurality of tributaries;
providing a clock with a system clock frequency (Fsys);
in a first memory, sequentially storing buffer-fill information for each tributary, at a rate of up to one tributary per Fsys cycle, as follows:
in a singe cycle of Fsys, accepting a new buffer-fill information word;
from a second (n×m) memory array, accepting a group of m buffer-fill information words;
replacing one of the buffer-fill information words from the group with the new buffer-fill information word, creating a new group of m buffer-fill information words; and,
simultaneously storing the new group of m buffer-fill information words in the first and second memory arrays;
updating a stored accumulation of buffer-fill information for each tributary at a sample rate frequency (Fsample), where Fsample≦Fsys;
using the stored accumulation of buffer-fill information to calculate stuff bit opportunities for each tributary;
regulating the rate of data being mapped into outgoing tributaries; and,
combining the outgoing mapped tributaries in a SPE.

* * * * *